Page of Patent: Jun. 16, 1992

United States Patent [19]
Uwai et al.

[11] Patent Number: 5,122,490
[45] Date of Patent: Jun. 16, 1992

[54] CATALYST COMPONENT FOR OLEFIN POLYMERIZATION

[75] Inventors: Toshihiro Uwai; Masami Tachibana; Teruaki Hayashida, all of Ichiharashi, Japan

[73] Assignee: Chisso Corporation, Osaka, Japan

[21] Appl. No.: 738,929

[22] Filed: Aug. 1, 1991

[30] Foreign Application Priority Data

Aug. 22, 1990 [JP] Japan ................... 2-220874

[51] Int. Cl.$^5$ ............................................. C08F 4/64
[52] U.S. Cl. ..................................... 502/113; 502/115; 502/116; 502/119; 502/120; 502/125; 502/126; 526/125; 526/116
[58] Field of Search ............... 502/113, 115, 116, 119, 502/120, 125, 126

[56] References Cited

U.S. PATENT DOCUMENTS 4,866,022  9/1989  Arzoumanidis et al. ........... 502/120

Primary Examiner—Patrick P. Garvin
Assistant Examiner—Brent M. Peebles
Attorney, Agent, or Firm—Fred Philpitt

[57] ABSTRACT

A catalyst component for olefin polymerization composed of a solid component (IV) and capable of affording a supported type catalyst composed of large particles and having a sharp particle size distribution is provided, which solid component (IV) is obtained by step A of reacting an organic Mg compound of a specified formula with a 1–20C saturated or unsaturated mono- or polyhydric alcohol ⓒ in the presence of $CO_2$ ⓑ;

step B of reacting the resulting component A, with a Ti halide (IV) and/or a vanadyl halide and/or a V halide and/or a halogenated silane ⓓ and an organic B compound of a specified formula or a siloxane compound of a specified formula or a silane compound having Si-O-Si bond;

Step C of reacting the resulting solid product (I) with a 1–20C saturated or unsaturated mono- or polyhydric alcohol ⓕ, an electron donor ⓖ and a cyclic ether ⓗ; and step D of reacting the resulting solid product (II) with component B ⓘ comprising Ti halide and/or vanadyl halide and/or V halide and/or halogenated silane, followed by reacting the resulting solid product (III) with component B ⓙ and an electron donor ⓚ.

7 Claims, 1 Drawing Sheet

CATALYST COMPONENT FOR OLEFIN POLYMERIZATION

BACKGROUND OF THE INVENTION

1. Field of the Invention

This invention relates to a catalyst for α-olefin polymerization. More particularly it relates to a titanium halide catalyst component supported on a magnesium compound, and a catalyst system containing such a component.

2. Description of the Related Art

As to magnesium-containing, supported type catalysts, those having a highly catalytic activity and a superior stereospecificity have been developed, and it has been well known that they are suitable for gas phase α-olefin polymerization since the catalyst residue in the resulting polymer therefrom can be easily treated and amorphous polyolefin (App) component is not required to be removed.

Further, in order to effect a good operability, it has been sought for the catalysts for gas phase α-olefin polymerization that they have a good particle shape, a narrow particle size distribution, a superior shatter resistance, etc.

As a process for improving the catalyst particle shape, Japanese patent application laid-open No. Sho 63-54405 discloses a process of dissolving a magnesium compound in an alcohol in the presence of carbon dioxide, followed by treating the solution with a mixture of a titanium halide with an organosilane to effect precipitation, adding a cyclic ether compound to effect redissolution and recrystallization and thereby obtain a carrier having a good shape, and activating it to obtain a catalyst.

In the case of gas phase α-olefin polymerization, many copolymers have been produced making use of a specific feature that the copolymer components are not dissolved off in solvents, etc., differently from the case of liquid phase polymerization, In the case where an adhesive polymer having a high content of copolymer components is produced, it is necessary that the particle diameter of the polymer powder is large for well keeping the fluidity of them so that a catalyst having a large particle diameter has been sought in order to obtain such a powder.
to well keep the fluidity of the polymer powder and hence it is necessary that the particle diameter of the polymer powder is large so that a catalyst having a large particle diameter has been sought in order to obtain such a powder.

In general, in the case of catalyst particles prepared according to a process of deposition from a solution, even when the carrier particles constituting the catalyst particles are neat and have a sharp particle size distribution, it has not been avoided that a part of the particles collapses at the subsequent activation treatment step, etc. Further, the larger the particles, the easier their collapse. Japanese patent application laid-open No. Sho 63-54405 discloses that when the particle diameter becomes as large as about 30 μ, the quantity of the particles collapsed increases during the activation treatment with titanium halide, etc. and fine particles increase. Thus, improvement in this respect has been left behind.

The present inventors have made extensive research in a process for particularly improving the particle shape and the particle size distribution of particles having a large particle diameter, when the particle diameter of the above catalyst system is controlled over from a small one to a large one, while retaining the high activity and the high stereospecificity of the catalyst system. As a result, we have achieved the present invention according to which it is possible to obtain a supported type catalyst of large particles having a sharp particle size distribution and an adjusted particle size while preventing the particle shatter during the steps of the catalyst production.

SUMMARY OF THE INVENTION

The main object of the present invention is to provide a process for producing a supported type catalyst of large particles having a sharp particle size distribution, suitable for olefin polymerization, particularly for gas phase olefin copolymerization.

The present invention has the following constitutions:

(1) A catalyst component for olefin polymerization composed of a solid product (IV) having a titanium halide, a vanadyl halide or a vanadium halide supported on a Mg compound as a main constituent deposited in a solution state,
which solid product (IV) is obtained by
step A of mixing and reacting in solution a magnesium compound expressed by the formula $Mg(OR^1)_n(OR^2)_{2-n}$ or $MgR^3_m(OR^4)_{2-m}$ a mixture thereof ⓐ
(wherein $R^1$, $R^2$, $R^3$ and $R^4$ each represent an alkyl group of 1 to 20 carbon atoms or an aryl group of 6 to 20 carbon atoms or a cycloalkyl group of 3 to 20 carbon atoms and m and n each represent an integer of 0 to 2), with a saturated or unsaturated monohydric or polyhydric alcohol each of 1 to 20 carbon atoms ⓒ, in the presence of carbon dioxide ⓑ, to obtain a component A, step B of mixing and reacting said component A, a titanium halide (IV) and/or a vanadyl halide and/or a vanadium halide and/or a halogenated silane halide ⓓ and a boron compound expressed by the formula $BR^9_t(OR^{10})_{3-t}$ or a mixture of a plurality of boron compounds of said formula or a silane compound expressed by the formula $SiR^{11}_v(OR^{12})_{4-v}$ or a siloxane compound having Si-O-Si bond or a mixture of the foregoing ⓔ
(wherein $R^9$ to $R^{12}$ each represent an alkyl group of 1 to 20 carbon atoms, a cycloalkyl group of 3 to 20 carbon atoms or an . aryl group of 0 to 20 carbon atoms, t represents an integer of 0 to 3 and v represents an integer of 0 to 4), to obtain a solid product (I), step C of reacting said solid product (I) with a saturated or unsaturated, monohydric or polyhydric alcohol ⓕ, an electron donor or a mixture of electron donors ⓖ and a cyclic ether ⓗ, to obtain a solid product (II), and step D of reacting said solid product (II) with a component B ⓘ comprising a titanium halide and/or a vanadyl halide and/or a vanadium halide and/or a halogenated silane, to obtain a solid product (III), followed by reacting said solid product (III) with said component B ⓙ, and an electron donor ⓚ to obtain said solid product (IV).

(2) A catalyst component according to item (1), wherein said electron donor ⓖ at the step C is an oxygen-containing hydrocarbon of 1 to 20 carbon atoms.

(3) A catalyst component according to item (1), wherein said electron donor ⓖ, at the step C is an aldehyde, a ketone, a carboxylic acid or an ether, each of 1 to 20 carbon atoms.

(4) A catalyst component according to item (1), wherein said alcohol (c) the step A and said alcohol (f) at the step C are each an alcohol of a saturated aliphatic hydrocarbon of 1 to 20 carbon atoms.

(5) A catalyst component according to item (1) wherein said titanium halide (d) at the step B and said titanium halides (i) and (j) at the step D are each expressed by the formula $TiX_p(OR^5)_{4-p}$ wherein X represents Cl or Br, $R^5$ represents an alkyl group of 1 to 20 carbon atoms, an aryl group of 6 to 20 carbon atoms or a cycloalkyl group of 1 to 20 carbon atoms and p represents an integer of 1 tp 4.

(6) A catalyst component according to item (1), wherein said vanadyl halide and vanadium halide at the steps B and D are expressed by the formula $VOX_q(OR^6)_{3-q}$ and $VX_r(OR^7)_{4-r}$, respectively, wherein X represents a halogen atom $R^6$ and $R^7$ each represent an alkyl group of 1 to 20 carbon atoms or an aryl group each of 6 to 20 carbon atoms or a cycloalkyl group of 3 to 20 carbon atoms, q represents an integer of 1 to 3 and r represents an integer of 1 to 4.

(7) A catalyst component for α-olefin polymerization, having a catalyst component as set forth in item (1), combined with an organoaluminum compound.

(8) A catalyst component for α-olefin polymerization having a catalyst component as set forth in either one of items (1) to (6), combined with an organometallic compound and further an electron donor as a third component combined therewith.

DETAILED DESCRIPTION OF PREFERRED EMBODIMENTS

Figure 1:
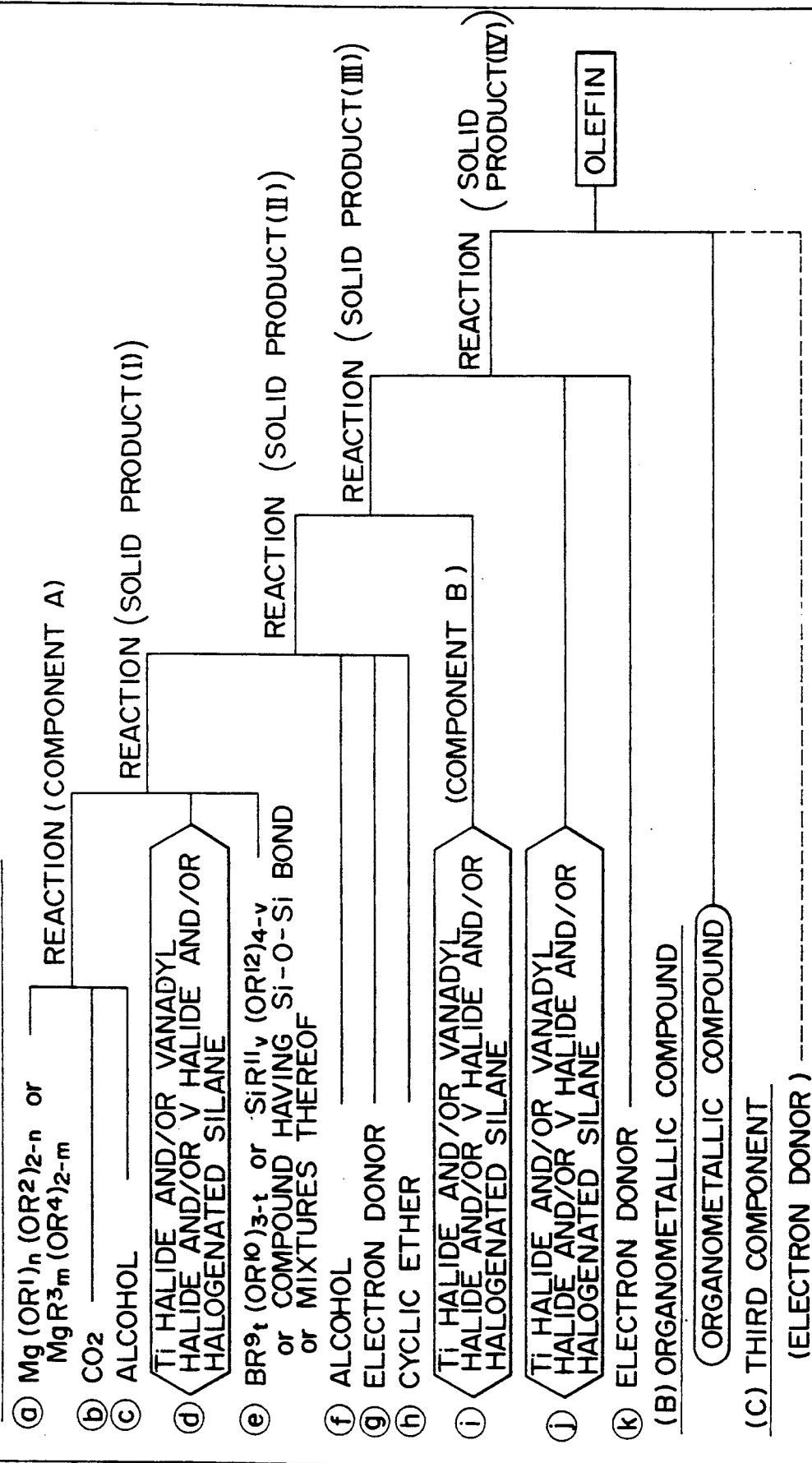

The constitutions and effectiveness of the present invention will be described below in more detail.

At first, the step A will be described.

At the step A, a magnesium compound expressed by the formula $Mg(OR^1)_n(OR^2)_{2-n}$ or $MgR^3{}_m(OR^4)_{2-m}$ or a mixture thereof (a) (wherein $R^1$, $R^2$, $R^3$ and $R^4$ each represent an alkyl group of 1 to 20 carbon atoms, a cycloalkyl group of 3 to 20 carbon atoms or an aryl group of 6 to 20 carbon atoms, and m and n each represent an integer of 0 to 2) is mixed with a saturated or unsaturated monohydric or polyhydric alcohol of 1 to 20 carbon atoms (c) in an inert hydrocarbon solvent to effect reaction and dissolution and thereby obtain component A.

The reaction may be carried out at 10° to 200° C., preferably 20° to 150° C. for 10 minutes to 24 hours, and it is preferred to feed the respective raw materials at room temperature of 10° to 30° C., followed by raising the temperature up to 20° to 150° C. to make the dissolution of the magnesium compound easy.

Examples of the magnesium alcoholates useful in the present invention are $Mg(OCH_3)_2$, $Mg(OC_2H_5)_2$, $Mg(OC_3H_7)_2$, $Mg(OC_4H_9)_2$, $Mg(OCH(CH_3)C_2H_5)_2$, $Mg(OC_8H_{17})_2$, $Mg(OCH_2 CH(C_2H_5)C_4H_9)_2$, $Mg(OCH_2CH=CH_2)_2$, $Mg(OC_6H_5)_2$, $Mg(OC_6H_{11})_2$, $Mg(OC_6H_4CH_3)_2$, $Mg(OC_{10}H_7)_2$, $Mg (OC_{10}H_6CH_3)_2$, $Mg(OC_{10}H_{17})_2$, $Mg(OC_{10}H_{16}CH_3)_2$, $Mg(OCH_3) (OC_2H_5)$, $Mg(OC_2H_5) (OC_6H_{13})$, $Mg(OC_2H_5) (OC_8H_{17})$, $Mg(OC_{36l} H_7) (OC_6H_5)$, etc.

Further, examples of the alkylmagnesiums are $Mg(CH_3)_2$, $Mg(C_2H_5)_2$, $Mg(C_3H_5)_2$, $Mg(C_4H_9)_2$, $Mg(C_6H_{13})_2$, $Mg(C_8H_{17})_2$, $Mg(CH=CHC_2H_5)_2$, $Mg(C_6H_5)_2$, $Mg(C_6H_4CH_3)_2$, $Mg(C_6H_{11})_2$, $Mg(C_{10}H_7)_2$, $Mg(CH_3) (C_2H_5)$, $Mg(C_2H_5) (C_6H_{11})$, $Mg(C_3H_7) (C_6H_5)$, etc.

The mixtures of these $Mg(OC_2O_5) (C_4H_9)$ and $Mg(OC_3H_7) (C_6H_5)$ may also be used.

As the component (c) alcohols, aliphatic saturated or unsaturated alcohols may be used. Concrete examples thereof are methanol, ethanol, propanol, isopropanol, isobutanol, t-butanol, octanol, 2-ethylhexanol, cyclohexanol, dodecanol, propenyl alcohol, butenyl alcohol and further, ethylene glycol, trimethylene glycol, etc. Among these, aliphatic alcohols of 2 to 10 carbon atoms are preferred.

Next, at the step B, component A is reacted with a titanium halide and/or a vanadyl halide and/or a vanadium halide and/or a halogenated silane (d), in presence of a boron compound expressed by the formula $BR^9{}_t(OR^{10})_{3-t}$ or a mixture of boron compounds of the formula or a silane compound expressed by the formula $SiR^{11}{}_v(OR^{12})_{4-v}$ or a siloxane compound having Si-O-Si bond or mixtures of the foregoing (e) (wherein $R^9$ to $R^{12}$ each represent an alkyl group of 1 to 20 carbon atoms or an aromatic group of 6 to 20 carbon atoms, t represents an integer of 0 to 3 and v represents an integer of 0 to 4) or a mixture of the foregoing, to obtain a solid product (I).

This reaction is preferably carried out in a suitable quantity of an inert hydrocarbon solvent such as aromatic, aliphatic hydrocarbons, etc.

As to the mixing order in the reaction, component A may be mixed with a siloxane compound, followed by adding to the mixture, a titanium halide and/or a vanadyl halide and/or a vanadium halide, but it is preferred to mix a siloxane compound with a titanium halide and/or a vanadyl halide and/or a vanadium halide and/or a halogenated silane, followed by adding component A to the mixture.

The mixing temperature may be −40° C. to +100° C., but −10° C. to +60° C. are preferred.

Examples of the boron compound (e) are methyl borate, ethyl borate, propyl borate, isopropyl borate, butyl borate, isobutyl borate, t-butyl borate, pentyl borate, octyl borate, 4-chlorobutylallyl borate, phenyl borate, toluyl borate, diethylcyclohexylborate, ethyldibutoxyborane, dibutylmonoethoxyborane, triethylborane, triisopropylborane, tributylborane, isobutylborane, t-butylborane, pentylborane, octylborane, triphenylborane, toluylborane, tricyclohexylborane, etc.

Examples of the silane compound are trimethylmonoethoxysilane, trimethylmonopropoxysilane, trimethylmonobutoxysilane, triethylmonomethoxysilane, triethylmonoethoxysilane, triethylmonobutoxysilane, tripropylmonoethoxysilane, tributylmonoethoxysilane, trihexylmonoethoxysilane, cyclohexyldimethoxysilane, triphenylmonoethoxysialne, dimethylisobutylmonoethoxysilane, dimethyldiethoxysilane, dimethyldipropoxysilane, dimethyldibutoxysilane, diethyldimethoxysilane, diethyldibutoxysilane, diisobutyldiethoxysilane, di-t-butyldimethoxysilane, cyclohexylmethyldiethoxysilane, dicyclohexyldimethoxysilane, diphenyldimethoxysilane, ditoluyldiethoxysilane, dicyclopentadienyldipropoxysilane, methyltriethoxysilane, methyltripropoxysilane, ethyltrimethoxysilane, cyclopentyltriethoxysilane, allyltrimethoxysilane, etc.

Examples of the siloxane compound are linear polysiloxanes expressed by the formula $R_3Si-(OSiR_2)_n-OSiR_3$ (wherein R represents an alkyl group of 1 to 20 carbon atoms, a cycloalkyl group of 3 to 20 carbon atoms or an aromatic group of 6 to 20 carbon atoms and n represents an integer of 1 to $10^3$), such as hexamethyldisiloxane, hexaethyldisiloxane, 20 carbon atoms and n represents an integer of 1 to $10^3$), such as hexamethyldisiloxane, hexaethyldisiloxane, hexabutyldisiloxane, octamethyltrisiloxane, decaethyltetrasiloxane, etc., alkoxyalkylpolysiloxanes partly having an alkoxy group such as hexamethyl-1,5-diethoxytrisiloxane, hexaethyl-1,5-dimethoxytrisiloxane, etc., alkylalkoxypolysiloxanes expressed by the formula $R(OR)_2Si$-${OSi(OR)_2}_n$-$OSi(OR)_2R$ such as hexaethoxy-1,5-dimethyltrisiloxane, octaethoxy-1,5-dimethyltrisiloxane, etc., and cyclic polysiloxanes expressed by the formula $(OSiR_2)_n$ such as hexamethylcyclotrisiloxane, octaethylcyclotetrasiloxane, etc.

The molar ratio Si/Mg of the boron compound or silane compound or siloxane compound or a mixture of the foregoing used at the stage B, to Mg from component A is representatively 0.1–2.0/1, preferably 0.3–1/1.

As the titanium halide (d), those expressed by the formula $TiX_p(OR^5)_{4-p}$ may be used. In this formula, X represents a halogen atom such as Cl, Br, etc., $R^5$ represents an alkyl group 1 to 20 carbon atoms, an aryl group of 6 to 20 carbon atoms or a cycloalkyl group of 3 to 20 carbon atoms and p represents an integer of i 4. Concrete examples thereof are titanium tetrachloride, titanium tetrabromide, methoxytitanium trichloride, ethoxytitanium trichloride, propoxytitanium trichloride, butoxytitanium trichloride, hexoxytitanium trichloride, octoxytitanium trichloride, cyclohexoxytitanium trichloride, ethoxytitanium tribromide, butoxytitanium tribromide, diethoxytitanium dichloride, dipropoxytitanium dichloride, dibutoxytitanium dichloride, dioctoxytitanium dichloride, dicyclohexoxytitanium dichloride, diethoxytitanium dibromide, trimethoxytitanium chloride, triethoxytitanium chloride, tributoxytitanium chloride, triethoxytitanium bromide, etc.

Titanium tetrabromide and titanium halides other than titanium tetrabromide may be prepared by reacting a titanium tetrahlaide with an o-titanic acid ester, but in place of the product prepared according to this reaction, a mixture of a titanium tetrahalide with an o-titanium acid ester may also be used. Among these titanium halides, titanium tetrachloride is most preferred.

Further, as the vanadyl halides and vanadium halides, compounds expressed by the formulas $VOX_q(OR^6)_{3-q}$ and $VX_r(OR^7)_{4-r}$ may be used. In these formulas, X represents a halogen atom such as Cl, Br, etc., $R^6$ and $R^7$ each represent an alkyl group of 1 to 20 carbon atoms, an aryl group of 6 to 20 carbon atoms or a-cycloalkyl group of 3 to 20 carbon atoms, q represents 1 to 3 and r represents 1 to 4.

Concrete examples thereof are vanadyl trichloride, vanadyl tribromide, ethoxyvanadyl dichloride, butoxyvanadyl dichloride, phenoxyvanadyl dichloride, methoxyvanadyl dibromide, propoxyvanadyl dibromide, cyclohexovanadyl dibromide, dimethoxyvanadyl chloride, diethoxyvanadyl chloride, dicyclohexoxyvanadyl chloride, dipropoxyvanadyl bromide, dibutoxyvanadyl bromide, vanadium tetrachloride, vanadium tetrabromide, methoxyvanadium trichloride, ethoxyvanadium tribromide, butoxyvanadium trichloride, cyclohexoxyvanadium tribromide, phenoxyvanadium trichloride, diethoxyvanadium dichloride, dibutoxyvanadium dibromide, phenoxyvanadium dichloride, trimethoxyvanadium chloride, triethoxyvanadium bromide, tripropoxyvanadium chloride, tributoxyvanadium bromide, triphenoxyvanadium chloride, etc.

As the halogenated silane, compounds expressed by the formula $SiX_s(OR^9)_{4-s}$ may be used. In this formula, X represents a halogen atom such as Cl, Br, etc., $R^9$ represents an alkyl group of 1 to 20 carbon atoms, an aromatic group of 6 to 20 carbon atoms or a cycloalkyl group of 3 to 20 carbon atoms and r represents 1 to 4.

Concrete examples thereof are silicon tetrachloride, silicon tetrabromide, methoxysilicon tribromide, ethoxysilicon trichloride, propoxysilicon tribromide, butoxysilicon trichloride, cyclohexoxysilicon trichloride, dimethoxysilicon dichloride, diethoxysilicon dibromide, dipropoxysilicon dichloride, dibutoxysilicon dibromide, diphenoxysilicon dichloride, trimethoxysilicon bromide, triethoxysilicon chloride, tripropoxysilicon bromide, tributoxysilicon chloride, etc. Further, mixtures of these may be used.

The mol ratio of the total mol number of metal(s) of the titanium halide or/and vanadyl halide or/and vanadium halide or/and halogenated silane, used at the step B, to the mol number of Mg originated from the component A is 1/0.3–20/1, preferably 1/0.5–5/1.

At the step C, the solid product (I) is dissolved in a solvent containing a cyclic ether (h) and redeposited to obtain a solid product (II). By this procedure of once dissolving the whole of the (I) and redepositing it, a carrier (solid product (II)) having an adjusted particle shape and particle diameter is obtained. In the deposited mother liquor at the step C., either one or a mixture (e) of the boron compound, silane compound and siloxane compound in the mother liquor at the step B is present, and while the mechanism has not yet been clarified, it has been found that the presence thereof at the time of the redeposition is effective for preventing the particles from shattering at the subsequent treatment step. When an alcohol (f) and an electron donor (g) such as organic acid, aldehyde, ketone, etc. are added together with a cyclic ether (h) or during the time since precipitation of the solid product (I) till addition of the cyclic ether, a carrier (solid product (II)) having a large particle diameter and a sharp particle size distribution is obtained.

Examples of the cyclic ether (h) are tetrahydrofuran, tetrahydropyran, methyltetrahydrofuran, dimethyltetrahydropyran, tetramethyltetrahydrofuran, dioxane, dioxolane, trioxane, pyran, benzopyran, dihydrobenzofuran, etc. Among these, tetrahydrofuran is most preferred.

The mol ratio of the cyclic ether to Mg originated from the component A at the step C is 0.1 to 100, preferably 1 to 10.

Examples of the alcohol (g) are alkanols such as methanol, ethanol, n-propanol, isopropanol, butanol, isobutanol, t-butanol, pentanol, hexanol, 2-ethylhexanol, ootanol, etc., cycloalkanols such as cyclopentanol, cyclohexanol, etc., diols such as 1,2-propanediol, 1,4-butanediol, etc., ethylene glycol, trimethylene glycol, and further propenyl alcohol, butenyl alcohol, etc.

Among these, alkanols of 2 to 10 carbon atoms, such as ethanol, propanol, isopropanol, butanol, 2-ethylhexanol, etc. are most preferred.

Examples of the electron donor (g) are oxygen (o)-containing compounds such as aldehyde, ester, ketone, ether compounds, sulfur (S)-containing compounds such as thiol, thioether, thiophene, thiane, thiolane, sulfonic acid, sulfonic acid esters, etc., nitrogen (N)-containing compounds such as amine, imine, pyridine, pyrrolidine, etc., phosphorus (P)-containing compounds such as diphenylphosphite, triphenylphosphite, etc.

Examples of the aldehyde are saturated aliphatic aldehydes such as formaldehyde, acetaldehyde, propionaldehyde, butyraldehyde, valeraldehyde, octaldehyde, decylaldehyde, isobutyraldehyde, isocapronaldehyde, 2-ethylhexylaldehyde, glyoxal, succindialdehyde, etc., aliphatic unsaturated aldehydes such as acrolein, crotonaldehyde, 2-ethyl-2-hexenylaldehyde, etc., aromatic aldehydes such as benzaldehyde, tolualdehyde, cinnamic aldehyde, etc., halogenated aldehydes such as 3-chloropropionaldehyde, p-bromobenzaldehyde, etc.

Examples of the carboxylic acid are saturated carboxylic acids such as formic acid, acetic acid, propionic acid, butyric acid, valeric acid, octylic acid, isobutyric acid, isovaleric acid, 2,2-dimethylpropionic acid, 2-ethylhexanoic acid, succinic acid, etc., unsaturated aliphatic acids such as acrylic acid, fumaric acid, maleic acid, etc., alicyclic acids such as cyclohexanecarboxylic acid, 1-cyclohexene-1,2-dicarboxylic acid, dicyclo[2,2,1]heptane-cis-2,3-dicaroxylic acid, etc., aromatic carboxylic acids such as benzoic acid, methylbenzoic acid, salic-ylic acid, 2,6-dimethylbenzoic acid, 2,6-di-t-butylbenzoic acid, phthalic acid, terephthalic acid, 4-ethylphthalic acid, 4-methoxyphthalic acid, etc., halogenated carboxylic acids such as 3-chlorobutyric acid, 3-bromopropionic acid, p-chlorobenzoic acid, 4-chlorophthalic acid, etc.

Further, examples of the ester are saturated alkyl esters such as methyl ester, ethyl ester, butyl ester, isopropyl ester, isobutyl ester, 2-ethylhexyl ester, etc. of the above carboxylic acids, esters of aromatic alcohols such as phenyl ester, toluyl ester, etc.

Examples of the ketone are saturated ketone compounds such as acetone, methyl ethyl ketone, pentanone, diisopropyl ketone, etc., unsaturated ketones such as ethyl vinyl ketone, etc., cyclic ketones such as cyclopentanone, cyclohexanone, 2,6-dimethylcyclohexanone, etc., aromatics-containing ketones such as phenyl methyl ketone, diphenyl ketone, p-chlorophenyl propyl ketone, etc.

Examples of the ether compound are saturated ether compounds such as ethyl ether, methyl ether, propyl ether, butyl ether, amyl ether, octyl ether, isopropyl ether, isoamyl ether, butyl hexyl ether, etc., aromatic ether compounds such as aryl methyl ether, aryl propyl ether, phenyl ethyl ether, diphenyl ether, etc.

The mol ratio of the electron donor such as aldehyde, carboxylic acid, etc., used at the step C to Mg originated from component A, at the time of mixing, is 0.001 to 50, preferably 0.005 to 5.

The temperature at the time of addition is −40° C. to +100° C., preferably −10° C. to +50° C. After the addition, the temperature is raised up to 40° to 150° C., preferably 40° to 100° C. for one minute to 4 hours, followed by reaction at this temperature for one minute to 4 hours, preferably 5 minutes to 2 hours.

After the step C., the solid product (II) may be separated from the reaction mother liquor by filtration or decantation, followed by using it at the step D, but it is preferred to use it after washing with an aromatic or aliphatic inert solvent such as toluene, hexane, heptane, etc.

At the step D, the solid product (II) is reacted with a titanium halide and/or a vanadyl halide and/or a vanadium halide and/or a halogenated silane (component B) ⓘ to obtain a solid product (III), followed by reacting the (III) with (component B) ⓙ and an electron donor ⓚ to obtain a solid product (IV).

Herein, the component B may be chosen from among the titanium halide, vanadyl halide, vanadium halide and halogenated silane described at the step B. As to the mixing of the solid product (II) or (III) with the component B, the component B may be added to the component (II) or (III), or the solid product (II) or (III) may be fed to the component B. Further, the electron donor ⓚ may be mixed with the component B in advance, or it may be separately added.

Examples of the electron donor ⓚ suitable to this treatment are aromatic mono- and poly- carboxylic acid esters. Examples of the aromatic polycarboxylic acid esters are benzene poly carboxylic acid esters, naphthalene polycarboxylic acid esters, etc.

Concrete examples are benzene polycarboxylic acid esters such as monomethyl phthalate, dimethyl phthalate, diethyl phthalate, dipropyl phthalate, mono-n-butyl phthalate, di-n-butyl phthalate, diisobutyl phthalate, di-t-butyl phthalate, di-n-hexyl phthalate, di-2-ethyl hexyl phthalate, n-octyl phthalate, diphenyl phthalate, etc. Examples of the aromatic monocarboxylic acid esters are benzoic acid esters and substituent-containing benzoic acid esters such as methyl benzoate, ethyl benzoate, butyl benzoate, isobutyl benzoate, cyclohexyl benzoate, methyl-p-toluate, ethyl-p-toluate, methyl-p-anisate, butyl-p-anisate, ethyl chlorobenzoate, methyl bromobenzoate, etc.

The electron donor ⓚ used at the step D is used in a quantity of about 0.0001 to 1.0 mol, preferably 0.005 to 0.8 mol per titanium or vanadium gram atom.

Examples of the inert hydrocarbon solvent for dilution or washing useful in the present invention are aromatics such as benzene, toluene, xylene, ethylbenzene, etc., halogenated aromatics such as chlorobenzene, dibromobenzene, p-chloroxylene, etc., aliphatics such as hexane, heptane, octane, nonane, decane, undecane, isopentane, isooctane, cyclohexane, cyclopentane, methylcyclohexane, etc., halogenated aliphatics such as 1,2-dichloroethane, 1,1,2-trichloroethane, carbon tetrachloride, etc., kerosine, mixtures of the foregoing, etc.

The catalyst component is prepared in an inert gas such as nitrogen, argon gas, or an α-olefin atmosphere, and in a state where catalyst poisons such as water, oxygen, CO, etc. has been removed. Further, purification of diluent and raw materials serves exclusion of catalyst poisons from the catalyst preparation system. As a result of the above preparation, the solid product (IV) suitable to be used as catalyst component is obtained.

Effectiveness of the Invention

According to the present invention, it is possible to prepare a catalyst for olefin polymerization, having a large particle diameter, while retaining a good catalyst shape, and since the particles do not or scarcely collapse during its preparation steps, a catalyst having a large particle diameter and a sharp particle size distribution is obtained.

As to the catalyst having a large particle diameter and a sharp particle size distribution, since its large shape is retained in the form of replica in the polymer formed by polymerization, even when adhesive polymer particles are formed, their fluidity is improved with a leap as compared with small particles. This fact has been well known by persons skilled in the art. The above fact is very useful for preparing a copolymer having a high content of copolymer component according to gas phase polymerization, with good operability.

The present invention will be described in more detail by means of Examples and Comparative examples.

The definitions of various properties specifying the polymers in Examples and Comparative examples and the measurement methods therefor are as follows:
1) Melt flow rate (abbreviated to MFR): according to ASTM D 1238 (L).
2) Bulk density of polymer (abbreviated to BD): according to ASTM D 1895.
3) Observations of the solid products (I) to (IV) and catalysts: according to optical microscope.
4) Particle size distribution of polymer: sought by means of sieves according to JIS Z 8801.

Further, the particle size distribution of catalyst was measured according to laser diffraction method, using dehydrated isoparaffin as a dispersion medium. As the measurement apparatus, Mastersizer made by Maruvern Instrument Co., Ltd. was employed.

Percentage of $C_7$-extraction residue: This refers to percentage of extraction residue after extraction of polymer with boiling n-heptane for 6 hours based upon the total weight of polymer before extraction.

EXAMPLE 1

Step A: Preparation of magnesium carbonate solution

Magnesium ethoxide (230 g) was placed in a 3L autoclave provided with a stirrer, a pressure gage and a thermometer and purged with high purity nitrogen gas, followed by adding 2-ethyl-1-hexanol (415 ml) and toluene (1,650 ml).

The resulting mixture was heated at 90° C. for 3 hous with stirring at 500 rpm in the presence of $CO_2$ under 3 $Kg/cm^2G$, followed by cooling the the resulting solution, purging $CO_2$ gas and treating it mainly under the atmospheric pressure. The resulting solution contained magnesium ethoxide (0.1 g/ml).

Step B: Preparation of solid particles

Into a 1,500 ml flat bottom flask provided with a stirrer, a thermometer, a condenser and a nitrogen gas-sealing line and equipped with a baffle (baffle ratio: 0.15), were fed toluene (300 m), $TiCl_{46l}$, (19 ml) and trimethylmonoethoxysilane (15 ml), followed by mixing them at 300 rpm for 5 minutes, and feeding the solution at the step A (150 ml) over 10 minutes. Just thereafter, solid particles (I) precipitated.

To the above solid particles were added ethanol (3 ml) and acetaldehyde (1.0 ml), 2-ethylhexanoic acid (2.0 ml) and tetrahydrofuran (THF) (50 ml) in this order, using separate syringes, followed by raising the temperature up to 60° C. within 15 minutes with stirring at 300 rpm.

The precipitated particles were dissolved in THF solution, and begun to reprecipitate within 15 minutes. Formation of solids completed within 10 minutes. Stirring was continued at 60° C. for 45 minutes, followed by stopping the stirring for sedimenting the resulting solids(II), removing the supernatant by decantation and twice washing the remaining solids (II) with toluene (200 ml).

Step D: Treatment with titanium (IV) compound

To the solids (II) at the step C were added toluene (200 ml) and $TiCl_4$ (100 ml), followed by raising the temperature up to 135° C. within 20 minutes with stirring at 600 rpm, keeping the temperature for one hour, stopping the stirring, sedimenting the resulting solids (III) and removing the supernatent by decantation.

To the resulting solids (III) were added $TiCl_4$ (100 ml), toluene (250 ml) and diisobutyl phthalate (2.1 ml), followed by stirring the mixture at 135° C. for 1.5 hour at 600 rpm and removing the supernatant by decantation.

To the resulting mixture was added $TiCl_4$ (200 ml), followed by heating the mixture under reflux for 10 minutes with stirring at 600 rpm, removing the supernatant by decantation, three times washing with toluene (200 ml) and further four times washing with hexane (200 ml), and drying at room temperature for one hour under reduced pressure in a nitrogen gas-sealed box. A solid product (IV) (9.3 g in total) was recovered. The analytical values of this solid product (IV) were as follows: Mg 19.0%, Ti 2.0%, Cl 58.3% and di-n-butyl phthalate 10.7%. The average particle diameter of the solid product (IV) was 44.1 $\mu$ and the content of particles of 5 $\mu$ or less was 0.2%.

Gas phase polymerization

Into a 3 l capacity stainless reactor equipped with a multi-stage stirrer and purged with nitrogen gas, were added triethylaluminum (2 mmol), diphenylmethoxysilane (0.3 mmol), the solid product (IV) (16.0 mg) and hydrogen (0.8 l), followed by carrying out polymerization for 2 hours while continuously introducing propylene so as to give a total pressure of 22 $Kg/cm^2G$ at 70° C.

Unreacted propylene was then discharged to obtain powdery polypropylene (357 g). The polymerization activity per the catalyst weight was 22300 g-pp/g-Cat. Most of the particle shape of the polypropylene was of crystalline, cubic or rhombic, hexagonal columnar form. The percentage of extraction residue of the polymer with boiling n-heptane for 6 hours was 99.2%, its MFR was 3.8 and its apparent density was 0.4B $g/cm^2$.

The particle size distribution of the polymer powder obtained by the polymerization is shown in Table 2.

EXAMPLE 2

Example 1 was repeated except that the solution at the step A of Example 1 was used in quantity of 150 ml, toluene (100 ml), chlorobenzene (100 ml) and diethyldiethoxysilane (17 ml) were used at the step B, hexanoic acid (1 ml), acetaldehyde (1 ml) and THF (40 ml) were used together with isopropanol (3 ml) at the step C and $TiCl_4$ (200 ml) was used as solvent and kept at 135° C. for one hour at the third $TiCl_4$ treatment at the stage D, to obtain a solid product (IV) (9.8 g) having an average particle diameter of 41.5 $\mu$. The content of particles of 5 $\mu$ or less was 0.2%.

EXAMPLE 3

Example 1 was repeated except that the solution at the step A of Example 1 was used in a quantity of 114 ml, methyltriethoxysilane (22 ml) was used as a silane compound at the step B, and a mixed solution of n-butanol (1.0 ml) with isobutanol (1.5 ml) as alcohol and n-butyraldehyde (1.5 ml) and isobutyric acid (1.0 ml) were used at the step C., to obtain a solid product (IV) (9.8 g) having an average particle diameter of 41.5 $\mu$. The content of particles of 5 $\mu$ or less was 0.3%.

EXAMPLE 4

Example 2 was repeated except that at the step C of Example 2, crotonaldehyde (2 ml), terephthalic acid (2 ml) and THF (45 ml) were used together with t-butanol (3 ml), and at the step D, diisobutyl phthalate was replaced by di-n-butyl phthalate (2.1 ml). The average particle diameter of the resulting solid product (IV) was 43.7 μ. The content of particles of 5 μ or less was 0.3%.

Comparative Example 1

Example 1 was repeated except that the alcohol, aldehyde and carboxylic acid were not used at the step C of Example 1, to obtain a solid product (IV) (12.0 g) having an average particle diameter of 24.1 μ. The content of finely divided particles of 5 μ or less was 2.7%.

Comparative Example 2

Comparative example 1 was repeated except that trimethylmonoethoxysilane was replaced by tetraethoxysilane at the step B of Comparative example 1, to obtain a solid product (IV) (12.5 g) having an average particle diameter of 22.3 μ. The content of finely divided particles of 5 μ or less was 4.2%.

Comparative Example 3

Comparative example 1 was repeated except that no silane compound was used at the step B of Comparative example 1, to obtain a solid product (IV) (11.0 g) having an average particle diameter of 8.2 μ. The content of particles of 5 μ or less was 35.5%.

EXAMPLE 5

Step B

Into a 5 l stainless reactor provided with a stirrer, a thermometer, a condenser, a nitrogen gas-sealing line and a raw materials-feeding line and equipped with a heating jacket and four flat baffles (baffle ratio: 0.15) therein, were fed toluene (1 l), hexamethyldisiloxane (100 ml) and $TiCl_4$ (100 ml), followed by agitating the mixture at 120 rpm for 5 minutes and then feeding the solution (750 ml) at the step A of Example 1 over 30 minutes.

Step C

To the mixture were added isobutanol (25 ml), 2-ethylhexylaldehyde (2.5 ml) and THF (250 ml), followed by raising the agitating speed up to 180 rpm, thereafter raising the temperature up to 60° C. within 15 minutes, and keeping this temperature for 45 minutes.

The resulting slurry after the reaction was transferred under nitrogen gas sealing, into a 5 l filtration device provided with a stirrer, a condenser, a thermometer and a nitrogen gas-sealing line and equipped with a heating jacket and a filtration unit at the bottom part, followed by filtering and twice washing with toluene (500 ml).

Step D

To the solid product (II) inside the filtration device were added $TiCl_4$ (500 ml) and toluene (500 ml), followed by keeping the mixture at 135° C. and 180 rpm and for one hour, filtering, adding $TiCl_4$ (500 ml), di-n-butyl phthalate (10.5 ml) and toluene (1,000 ml), keeping the mixture at 135° C. and 180 rpm and for 1.5 hour, and filtering.

To the resulting solid product (IV) was further added $TiCl_4$ (1,000 ml), followed by heating under reflux for 10 minutes, filtering, three times washing with toluene (500 ml) and further 4 times washing with hexane (500 ml), and drying the solid product (IV) remaining in the filtration device, by passing hot nitrogen gas at about 60° C., to obtain a catalyst (58.5 g).

The analytical values of the solid product (IV) were as follows: Mg 18.5%, Ti 2.3%, Cl 57.1% and di-n-butyl phthalate 9.2%. The average particle diameter of the solid product (IV) was 39.5 μ. The content of particles of 5 μ or less was 0.1%.

EXAMPLE 6

Example 5 was repeated except that hexamethyl-1,5-diethoxytrisiloxane (150 ml) was used as a siloxane at the step B of Example 5; ethanol (30 ml), tolualdehyde (6.5 ml) and THF (250 ml) were used at the step C; and $TiCl_4$ treatment at the step carried out at two stages and the third $TiCl_4$ washing was not carried out, to obtain a solid product (IV) (61.2 g) having an average particle diameter of 36.4 μ. The content of particles of 5 μ or less was 0.1%.

EXAMPLE 7

Example 5 was repeated except that at the step C of Example 5, methanol (15 ml) was used as alcohol and 2-ethyl-2-hexenylaldehyde (4.0 ml) was used as aldehyde, to obtain a solid product (IV) (60.7 g) having an average particle diameter of 38.2 μ. The content of particles of 5 μ or less was 0.2%.

EXAMPLE 8

Example 5 was repeated except that as the solvent at the step B of Example 5, a mixed solution of toluene (500 ml) with chlorobenzene (500 ml) was used; at the step C, no aldehyde is used, but propionic acid (60 ml) was used as carboxylic acid and THF (350 ml) was used, to obtain a solid product (IV) (32.8 g) having an average particle diameter of 48.5 μ. The content of particles of 5 μ or less was 0.2%.

Comparative Example 4

Example 5 was repeated except that at the step C of Example 5, alcohol and aldehyde were not used, to obtain a solid product (IV) having an average particle diameter of 20.3 μ. The content of finely divided particles of 5 μ or less was 4.3%.

Comparative Example 5

Comparative example 4 was repeated except that at the step B of Comparative example 4, no siloxane compound was used, to obtain a solid product (IV) (52.0 g) having an average particle diameter of 10.9 μ. The content of particles of 5 μ or less was 28.3%.

EXAMPLE 9

Example 1 was repeated except that the solution (150 ml) at the step A of Example 1 was used; at the step B, toluene (100 ml) and chlorobenzene (100 ml) were used as solvent and the silane compound was replaced by tributoxyborane (20 ml); and at the step C., cyclohexanoic acid (6 ml) and THF (50 ml) were used together with isopropanol (3 ml), to obtain a solid product (IV) (8.3 g) having an average particle diameter of 46.2 μ. The content of particles of 5 μ or less was 0.3%.

Comparative Example 6

Example 9 was repeated except that at the step C of Example 9, the alcohol and carboxylic acid were not used, to obtain a solid product (IV) (12.9 g) having an average particle diameter of 25.3 μ. The content of finely divided particles of 5 μ or less was 3.4%.

EXAMPLE 10

Example 9 was repeated except that as the solvent at the step B of Example 9, chlorobenzene (200 ml), alone, was used; and at the step C., 2-ethylhexanoic acid (4 ml), p-chlorobenzoic acid (3 ml) and THF (60 ml) were used together with ethanol (2 ml), to obtain a solid product (IV) (7.9 g) having an average particle diameter of 45.0 μ. The content of particles of 5 μ or less was 0.2%.

EXAMPLE 11

Step A

Into a 3 l autoclave provided with a stirrer, a pressure gage and a thermometer and purged with high purity nitrogen gas, was placed magnesium propoxide (238 g), followed by adding 2-ethyl-1-hexanol (415 ml) and toluene (1,650 ml).

The mixture was heated at 90° C. for 3 hours with stirring at 500 rpm in the presence of $CO_2$, followed by cooling the resulting solution, purging $CO_2$ gas, and treating mainly under the atmospheric pressure. The solution contained magnesium propoxide (0.1 g/ml).

Example 9 was repeated except that the solution (150 ml) of the step A referred to herein was used; at the step C, terephthalic acid (4 ml) and acetic acid (2 ml) were used together with 2-ethylhexanol, and THF (40 ml) was used. The yield of the resulting solid product (IV) was 7.6 g and its average particle diameter was 46.3 μ.

EXAMPLE 12

Example 1 was repeated except that at the step C of Example 1, n-butanol (10 ml), acetaldehyde (0.8 ml) and formic acid (4 ml) were used and THF (50 ml) was replaced by 2-methyltetrahydrofuran (60 ml), to obtain a solid product (IV) (11.8 g) having an average particle diameter of 32.4 μ. The content of particles of 5 μ or less was 1.3%.

Comparative Example 7

Example 12 was repeated except that at the step C of Example 12, the alcohol and aldehyde were not used, to obtain a solid product (IV) ( 14.2 g ) having an average particle diameter of 15.8 μ. The content of finely divided particles of 5 μ or less was 16.3%.

EXAMPLE 13

Example 2 was repeated except that at the step C of Example 1, 2-ethylhexylaldehyde (1 ml) and cyclohexanone (5 ml) were used together with methanol (3 ml), and THF (45 ml) was used, to obtain a solid product (IV) having an average particle diameter of 45.1 μ. The content of particles of 5 μ or less was 0.5%.

EXAMPLE 14

Example 13 was repeated except that cyclohexanone (5 ml) was replaced by acetone (4 ml), to obtain a solid product (IV) having an average particle diameter of 47.3 μ. The content of particles of 5 μ or less was 0.3%.

EXAMPLE 15

Example 2 was repeated except that at the step C of Example 13, cyclohexanone (5 ml) was replaced by diphenyl ketone (2 ml) and p-chlorophenyl propyl ketone (2 ml), to obtain a solid product (IV) having an average particle diameter of 42.6 μ. The content of particles of 5 μ or less was 0.3%.

EXAMPLE 16

Example 5 was repeated except that at the step C of Example 5, ethyl acetate (10 ml) was used together with isobutanol (25 ml) and 2-ethylhexylaldehyde (2.5 ml), to obtain a solid product (IV) having an average particle diameter of 43.3 μ. The content of particles of 5 μ or less was 0.3%.

EXAMPLE 17

Example 16 was repeated except that at the step C of Example 16, ethyl acetate was replaced by diisobutyl phthalate (5 ml) and isobutyl propionate (12 ml), to obtain a solid product (IV) having an average particle diameter of 43.1 μ. The content of particles of 5 μ or less was 0.5%.

EXAMPLE 18

Example 9 was repeated except that at the step C of Example 9, diethylene glycol diethyl ether (3 ml) was used together with i-propanol (3 ml) and hexanoic acid (3 ml), to obtain a solid product (IV) having an average particle diameter of 43.7 μ. The content of particles of 5 μ or less was 0.2%.

EXAMPLE 19

At the step C of Example 18, diethylene glycol was replaced by 2,2,6,6-tetramethylpiperidine (1 g), to obtain a solid product (IV) having an average particle diameter of 44.2 μ. The content of particles of 5 μ or less was 0.6%.

EXAMPLE 20

Example 2 was repeated except that at the step C of Example 2, thiophene (1 ml) was further added as an electron donor, to obtain a solid product (IV) having an average particle diameter of 45.5 μ. The content of particles of 5 μ or less was 0.4%. Evaluation of gas phase polymerization Solid products (IV) obtained in Examples 2 to 8 and Comparative examples 1 to 3 were subjected to gas phase polymerization in the same manner as in Example 1. The results are shown in Table 1. The particle size distributions of polymers of Examples 1 and 2 and Comparative examples 1, 2 and 3 are shown in Table 2. Evaluation of slurry polymerization Using the catalysts (solid products (IV)) obtained in Examples 9 to 20 and Comparative examples 4 to 7, hexane slurry polymerization of propylene was carried out.

Hexane (1,000 ml) was placed in a 1.5 l autoclave, followed by adding TEA (2 mmol), diphenyldimethoxysilane (0.2 mmol) and a catalyst (15 to 17 mg), introducing hydrogen gas (60 ml) and polymerizing propylene kept under a pressure of 7 $Kg/cm^2G$ at 70° C. for 2 hours. After completion of the reaction, the monomer gas was purged, followed by adding methanol (50 g), agitating at 70° C. for 10 minutes, filtering off, drying the polymer and calculating the polymer yield per the quantity of the catalyst used. Polymer dissolved in hexane was recovered from the filtrate. The results are shown in Table 3.

EXAMPLE 21

Using the catalyst obtained in Example 2, bulk polymerization was carried out.

Into a 1 l bulk polymerization vessel were fed TEA (2 mmol), phenyltriethoxysilane (0.3 mmol), catalyst (10 mg) and hydrogen (300 ml) together with propylene (500 g), followed by polymerizing at 70° C. for 30 minutes and purging unreacted propylene monomer, to obtain dry powder (265 g). The polymer yield per g of the catalyst was 26,500 g. The percentage of extraction residue under heptane reflux for 6 hours was 98.1%, MFR was 8.5 and the apparent bulk density of polymer was 0.50 g/cm$^2$.

EXAMPLE 22

Using the catalyst (10 mg) obtained in Example 5, bulk polymerization was carried out for 20 minutes in all the same manner as in Example 21, followed by purging unreacted propylene and introducing a mixed gas of propylene/ethylene=2/1 and hydrogen gas (150 ml) to carry out gas phase polymerization at 70° C., under 18 Kg/cm$^2$G for 30 minutes. The polymer yield was 224 g, T-MFR was 1.9 and the ethylene content in polymer was 12.5%.

EXAMPLE 23

Into the polymerization vessel of Example 1 were fed the catalyst (16 mg) obtained in Example 5, TEA (2 mmol), diphenyldimethoxysilane (0.2 mmol) and hydrogen (150 ml), by means of propylene monomer, followed by introducing a mixed gas of propylehe/ethylene=4/1, to carry out propylene-ethylene copolymerization at 70° C. under 22 Kg/cm$^2$G for one hour. The polymer yield was 215 g, and the ethylene content in the polymer was 44%.

TABLE 1

| Nos. of Example and Comp. ex. | Gas phase polymerization results | | | |
|---|---|---|---|---|
| | Catalyst activity (g-PP/g-Cat.) | % of C$_7$ extraction residue | M F R (g/10 min.) | Apparent bulk density of polymer (g/cm$^3$) |
| Example | | | | |
| 2 | 23200 | 99.1 | 3.2 | 0.47 |
| 3 | 23700 | 98.5 | 3.6 | 0.46 |
| 4 | 24100 | 98.9 | 4.3 | 0.47 |
| 5 | 24300 | 99.0 | 3.5 | 0.48 |
| 6 | 23900 | 98.7 | 4.0 | 0.47 |
| 7 | 23100 | 98.5 | 4.6 | 0.48 |
| 8 | 23500 | 98.7 | 3.8 | 0.48 |
| Comp. ex. | | | | |
| 1 | 21500 | 98.4 | 4.2 | 0.45 |
| 2 | 17700 | 97.2 | 4.8 | 0.41 |
| 3 | 17400 | 97.5 | 5.0 | 0.37 |
| 4 | 23800 | 98.5 | 4.4 | 0.46 |
| 5 | 16900 | 97.8 | 4.2 | 0.40 |

TABLE 2

| | Particle size distribution of gas phase polymerization polymer | | | | |
|---|---|---|---|---|---|
| | Example 1 (%) | Example 2 (%) | Comp. ex. 1 (%) | Comp. ex. 2 (%) | Comp. ex. 3 (%) |
| Powder Particle diameter | | | | | |
| 2000μ < | 2.1 | 3.4 | 0.1 | 0.0 | 0.0 |
| 1400–2000μ | 56.8 | 47.6 | 1.2 | 0.6 | 0.4 |
| 1000–1400μ | 29.1 | 36.9 | 9.7 | 7.4 | 5.3 |
| 710–1000μ | 8.5 | 9.1 | 41.5 | 39.1 | 16.1 |
| 500–710μ | 3.0 | 2.5 | 31.4 | 34.5 | 13.6 |
| 355–500μ | 0.3 | 0.3 | 10.8 | 12.7 | 9.7 |
| 250–355μ | 0.1 | 0.1 | 3.2 | 3.2 | 6.2 |
| 180–250μ | 0.1 | 0.1 | 0.5 | 0.6 | 13.0 |
| 106–180μ | 0.0 | 0.0 | 1.0 | 1.0 | 12.7 |
| < 106μ | 0.0 | 0.0 | 0.6 | 0.9 | 23.0 |
| Average particle diameter (μ) | 1480μ | 1410μ | 725μ | 690μ | 270μ |

TABLE 3

| Nos. of Example and Comp. ex. | Slurry polymerization results | | | | |
|---|---|---|---|---|---|
| | Catalyst activity (g-PP/g-Cat.) | nC$_6$-solubles (%) | % of nC$_7$ extraction residue | M F R (g/10 min.) | Apparent bulk density of polymer (g/cm$^3$) |
| Example | | | | | |
| 9 | 12300 | 0.37 | 99.02 | 3.5 | 0.48 |
| 10 | 10700 | 0.62 | 98.43 | 4.0 | 0.47 |
| 11 | 11300 | 0.50 | 98.65 | 3.1 | 0.47 |
| 12 | 9800 | 0.65 | 97.92 | 4.3 | 0.46 |
| 13 | 9500 | 0.40 | 98.29 | 3.7 | 0.48 |
| 14 | 10200 | 0.59 | 98.22 | 4.6 | 0.47 |
| 15 | 9700 | 0.71 | 98.03 | 4.0 | 0.47 |
| 16 | 11500 | 0.46 | 98.74 | 3.4 | 0.48 |
| 17 | 10900 | 0.57 | 98.49 | 3.6 | 0.47 |
| 18 | 10100 | 0.52 | 98.56 | 3.5 | 0.47 |
| 19 | 10600 | 0.53 | 98.50 | 4.3 | 0.46 |
| 20 | 9600 | 0.83 | 97.36 | 5.2 | 0.45 |

TABLE 3-continued

| Nos. of Example and Comp. ex. | Slurry polymerization results | | | | |
|---|---|---|---|---|---|
| | Catalyst activity (g-PP/g-Cat.) | nC$_6$-solubles (%) | % of nC$_7$ extraction residue | MFR (g/10 min.) | Apparent bulk density of polymer (g/cm$^3$) |
| Comp. ex. | | | | | |
| 6 | 11200 | 0.43 | 98.93 | 3.2 | 0.47 |
| 7 | 9600 | 1.02 | 97.34 | 4.8 | 0.41 |

What we claim is:

1. A catalyst component for olefin polymerization composed of a solid product (IV) obtained by
(1) in a first step A producing a first component A by mixing and reacting in solution in the presence of carbon dioxide
   (a) a magnesium compound expressed by the formula
      (i) $Mg(OR^1)_n(OR^2)_{2-n}$ or
      (ii) $MgR^3_m(OR^4)_{2-m}$ or
      (iii) a mixture thereof, wherein $R^1$, $R^2$, $R^3$ and $R^4$ each represent an alkyl group of 1 to 20 carbon atoms or an aryl group of 6 to 20 carbon atoms or a cycloalkyl group of 3 to 20 carbon atoms and m and n each represent an integer of 0 to 2,
with
   (b) a saturated or unsaturated monohydric or polyhydric alcohol having 1 to 20 carbon atoms,
(2) in a second step B producing a solid product (I) by mixing and reacting said first component A with
   (d)
      (i) a titanium halide (IV) and/or
      (ii) a vanadyl halide and/or vanadium halide and/or
      (iii) a halogenated silane, and
      (iv) at least one boron compound expressed by the formula $BR^9_t(OR^{10})_{3-t}$, or
   (e)
      (i) a silane compound expressed by the formula $SiR^{11}_v(OR^{12})_{4-v}$ or
      (ii) at least one siloxane compound having a Si-O-Si bond
      wherein $R^9$ to $R^{12}$ each represent an alkyl group of 1 to 20 carbon atoms, a cycloalkyl group of 3 to 20 carbon atoms or an aromatic group of 6 to 20 carbon atoms, t represents an integer of 0 to 3 and v represents an integer of 0 to 4,
(3) in a third step C producing a solid product (II) by reacting said solid product (I) with
   (f) a saturated or unsaturated monohydric or polyhydric alcohol, having 1 to 20 carbon atoms,
   (g) an electron donor or a mixture of electron donors, and
   (h) a cyclic ether and
(4) in a fourth step D producing a solid product (III) by reacting said solid product (II) with a component B comprising
   (i)
      (i) a titanium halide and/or
      (ii) a vanadyl halide and/or
      (iii) a vanadium halide and/or
      (iv) a halogenated silane,
   and
(5) in a fifth step E producing a solid product (IV) by reacting said solid product (III) with
   (j) said component (i) of step (4), and
   (k) an electron donor.

2. A catalyst component according to claim 1 wherein said electron donor in the step C is an oxygen-containing hydrocarbon of 1 to 20 carbon atoms.

3. A catalyst component according to claim 1 wherein said electron donor in the third step C is an aldehyde, a ketone, a carboxylic acid or an ether, each of 1 to 20 carbon atoms.

4. A catalyst component according to claim 1 wherein said alcohol at the first step A and said alcohol (f) at the step C are each an alcohol of a saturated aliphatic hydrocarbon of 1 to 20 carbon atoms.

5. A catalyst component according to claim 1 wherein said titanium halide in the second step B and said titanium halides of component B in steps D and E are each expressed by the formula $TiX_p(OR^5)_{4-p}$ wherein X represents Cl or Br, $R^5$ represents an alkyl group of 1 to 20 carbon atoms, an aryl group of 6 to 20 carbon atoms or a cycloalkyl group of 3 to 20 carbon atoms and p represents an integer of 1 to 4.

6. A catalyst component according to claim 1 wherein said vanadyl halide and vanadium halide of steps B and D are expressed by the formula $VOX_q(OR^6)_{3-q}$ and $VX_r(OR^7)_{4-r}$, respectively, wherein X represents a halogen atoms, $R^6$ and $R^7$ each represent an alkyl group of 1 to 20 carbon atoms or an aryl group each of 6 to 20 carbon atoms or a cycloalkyl group of 3 to 20 carbon atoms, q represents an integer of 1 to 3 and r represents an integer of 1 to 4.

7. A catalyst component as set forth in claim 1 which combined with both an organometallic compound and an electron donor.

* * * * *